(12) United States Patent
Sugiyama et al.

(10) Patent No.: US 7,420,304 B2
(45) Date of Patent: Sep. 2, 2008

(54) BEARING UNIT AND ELECTRIC MOTOR FURNISHED THEREWITH

(75) Inventors: Tomotsugu Sugiyama, Kyoto (JP);
Yasuyuki Kaji, Kyoto (JP); Yuji Yabuuchi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/549,981

(22) Filed: Oct. 17, 2006

(65) Prior Publication Data

US 2007/0120433 A1    May 31, 2007

(30) Foreign Application Priority Data

Oct. 17, 2005 (JP) .............................. 2005-301353
Oct. 11, 2006 (JP) .............................. 2006-278040

(51) Int. Cl.
*H02K 5/16* (2006.01)
(52) U.S. Cl. ..................... 310/90; 310/90.5; 310/67 R
(58) Field of Classification Search ................ 310/51, 310/67 R, 90, 90.5
See application file for complete search history.

(56) References Cited

U.S. PATENT DOCUMENTS

| 4,755,709 | A | * | 7/1988 | De Jager | 310/90.5 |
| 5,453,650 | A | * | 9/1995 | Hashimoto et al. | 310/268 |
| 6,020,664 | A | * | 2/2000 | Liu et al. | 310/90 |
| 6,031,651 | A | * | 2/2000 | Nakasugi | 359/200 |
| 6,246,140 | B1 | * | 6/2001 | Horng | 310/91 |
| 6,544,011 | B2 | * | 4/2003 | Hsieh | 417/423.7 |
| 6,680,814 | B2 | | 1/2004 | Nii et al. | |
| 6,756,714 | B2 | * | 6/2004 | Alex et al. | 310/90 |
| 6,882,074 | B2 | * | 4/2005 | Horng et al. | 310/90 |
| 2004/0132881 | A1 | * | 7/2004 | Okamiya et al. | 524/284 |
| 2004/0232781 | A1 | * | 11/2004 | Yoo | 310/51 |
| 2005/0023907 | A1 | * | 2/2005 | Neal | 310/43 |
| 2005/0031237 | A1 | * | 2/2005 | Gomyo et al. | 384/110 |
| 2005/0116564 | A1 | * | 6/2005 | Tokunaga et al. | 310/90 |
| 2005/0140225 | A1 | * | 6/2005 | Fujinaka et al. | 310/90 |
| 2005/0184609 | A1 | * | 8/2005 | Chen et al. | 310/90.5 |
| 2005/0264117 | A1 | * | 12/2005 | Hata et al. | 310/90 |
| 2006/0131972 | A1 | * | 6/2006 | Yang et al. | 310/90.5 |

FOREIGN PATENT DOCUMENTS

| JP | S52-095010 |   | 8/1977 |
| JP | S55-123019 | A | 9/1980 |
| JP | H01-176215 | U | 12/1989 |
| JP | H04-075443 | A | 3/1992 |
| JP | 2620393 | B2 | 3/1997 |
| JP | H09-200995 | A | 7/1997 |
| JP | H09-317755 | A | 12/1997 |
| JP | H10-127004 | A | 5/1998 |

(Continued)

*Primary Examiner*—Thanh Lam
(74) *Attorney, Agent, or Firm*—Volentine & Whitt, PLLC

(57) ABSTRACT

Bearing unit furnished with a bearing retaining part, the bearing retaining part formed from a single, seamless component and furnished with a cylindrical section disposed on the outer periphery of a sleeve of the bearing unit, and with a bottom section closing over the sleeve and the cylindrical section along their undersides. An attracting magnet is disposed on the bottom-section side of the bearing retainer, for magnetically attracting axis-wise the lower-end portion of a shaft of the bearing unit. A magnet holder, formed from a magnetic material, is disposed on the underside of the attracting magnet, with the magnet holder being attached to the bearing retainer.

20 Claims, 10 Drawing Sheets

FOREIGN PATENT DOCUMENTS

| | | | |
|---|---|---|---|
| JP | 2856027 B2 | 11/1998 | |
| JP | 2000-245101 A | 9/2000 | |
| JP | 2000245101 A | * | 9/2000 |
| JP | 2000-306319 A | 11/2000 | |
| JP | 2001-050250 A | 2/2001 | |
| JP | 2001050250 A | * | 2/2001 |
| JP | 2001-093223 A | 4/2001 | |
| JP | 2002-257133 A | 9/2002 | |
| JP | 2002-345204 A | 11/2002 | |
| JP | 2004-023828 A | 1/2004 | |
| JP | 2005-192262 A | 7/2005 | |
| JP | 2006-177406 A | 7/2006 | |
| WO | WO-03/107513 A1 | 12/2003 | |

* cited by examiner

US 7,420,304 B2

BEARING UNIT AND ELECTRIC MOTOR FURNISHED THEREWITH

BACKGROUND OF THE INVENTION

1. Technical Field

The present invention relates to bearing units, and to electrically powered motors furnished with the bearing units.

2. Description of the Related Art

With numerous fan motors and drive motors for disk-drive and like applications being installed in electronic devices these days, lower-noise motor operation is being called for, in part because occasions in which such devices are employed in the home and in the office are increasing.

Fan motors that adopt sliding bearings are one answer to this call. In such motors, a rotary shaft serving as the rotor section is inserted into a sleeve, wherein the rotary shaft is rotatably supported via a lubricating oil. Inasmuch as the rotary shaft in this configuration is axially shiftable with respect to the sleeve, a number of techniques have been proposed to prevent the rotary-shaft-furnished rotary section from coming out of the sleeve.

One example of such a technique is to magnetically attract the fore-end portion of the rotary shaft with an attracting magnet via a thrust bearing. The attracting magnet is disposed underneath the rotary shaft and the sleeve, and is accommodated in a cuplike back yoke. In turn, the back yoke is mounted in a holder that retains the sleeve.

In the structure just described, however, the holder and the back yoke are constituted from separate parts; moreover, the back yoke is mounted on the holder. A consequence of this makeup is that the lubricating oil retained in the sleeve can pass the joint between the holder and the back yoke, and leak out to the motor exterior. Oil thus leaking out of the motor dramatically compromises its reliability and endurance.

BRIEF SUMMARY OF THE INVENTION

A motor bearing unit in one example of the present invention is furnished with: a sleeve, and, inserted into the sleeve, a shaft having an outer circumferential surface opposing the inner circumferential surface of the sleeve and rotating, centered on a center axis, relative to the sleeve; and a radial bearing section, retaining a lubricating fluid as a working fluid, and supporting the shaft and the sleeve during the relative rotation between them.

The bearing unit is further furnished with a bearing retaining part formed from a single, seamless component, and provided with a round cylindrical section disposed on the outer periphery of the sleeve, and with a bottom section closing over the sleeve and the cylindrical section along their undersides.

An attracting magnet is disposed on the bottom-section side of the bearing retainer, for magnetically attracting axiswise the lower-end portion of the shaft.

A magnet holder, formed from a magnetic material, is disposed on the underside of the attracting magnet, with the magnet holder being attached to the bearing retainer.

The bearing unit in one example of the present invention serves to prevent the lubricating fluid from flowing out to the motor exterior from the bottom section of the bearing retaining part.

Another advantage is that the fore-end portion of the shaft is attracted by the force of magnetic attraction of the attracting magnet. This enables the axial position of the motor's rotor section to be governed. As a result, compared with the conventional technique of displacing the axial magnetic center of a motor's rotor magnet with respect to the axial magnetic center of the motor's stator core, the occurrence of electromagnetic noise and the occurrence of vibrations can be reduced.

It should be understood that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated.

From the following detailed description in conjunction with the accompanying drawings, the foregoing and other objects, features, aspects and advantages of the present invention will become readily apparent to those skilled in the art.

DETAILED DESCRIPTION OF THE INVENTION

Figure 1:
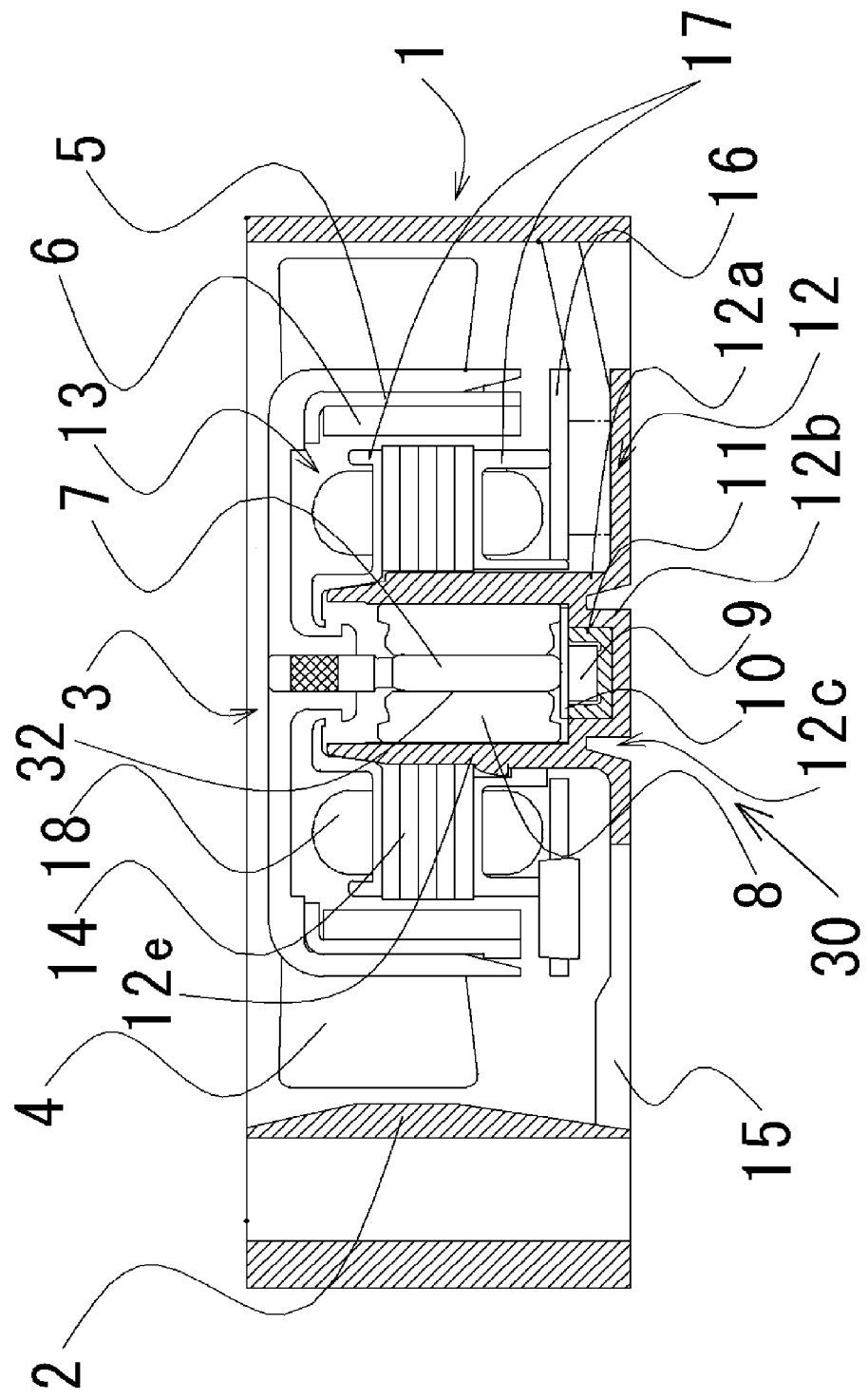
FIG. 1 is a cross sectional view depicting a first embodiment of the present invention.

Hereinafter, motors of respective embodiments of the present invention will be described with reference to FIG. 1 through FIG. 10. It should be understood that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Furthermore, for convenience's sake in the description, orientation paralleling the center axis is expressed as "axially."

FIRST EMBODIMENT

Reference is made to FIG. 1, a cross sectional view depicting a fan motor according to a first embodiment of the present invention.

In a fan motor 1, an impeller 4 having a plurality of blades is attached to a rotor section 3 that, by being supplied with current from an external source, rotationally drives the impeller 4. The rotor section 3 includes a shaft 7. The rotor section 3 is unitarily molded so that the shaft 7 is fixed in the center portion of the impeller 4.

The fan motor 1 is furnished with a bearing unit 30. The bearing unit 30 is furnished with the shaft 7, a bearing retaining part, a sleeve 8, and a later-described attracting magnet 9.

As the bearing retaining part, in the center portion of a frame 12, a bearing housing 12a in roughly cup form is defined. The bearing housing 12a is furnished with: a cylindrical section 12e, disposed on the outer periphery of the sleeve 8, for retaining the sleeve 8; and a bottom section 12b for closing over the sleeve 8 and the cylindrical section 12e along their lower side. The bearing housing 12a furnished with the cylindrical section 12e and the bottom section 12b are formed from a seamless single component. Furthermore, the bearing housing 12a and the frame 12 are molded together by injection-molding of a plastic resin material.

The sleeve 8 is supported by being press-fit into the bearing housing 12a. The shaft 7 is inserted into the sleeve 8, running along the sleeve's inner circumferential surface. The sleeve 8 is a porous sintered metal formed by a powder metallurgy process. The inner portion of the sleeve 8 is impregnated with lubricating oil as a lubricating fluid. Owing to the impregnation of the sleeve 8 with lubricating oil, the shaft 7 as supported by the sleeve 8 via the oil is free-spinning.

Defined between the outer circumferential surface of the shaft 7 and the inner circumferential surface of the sleeve 8 is a radial bearing portion 32 that retains the aforementioned lubricating oil as a working fluid and supports the shaft 7 when the rotor section 3 is spinning. It will be appreciated that the radial bearing portion 32 may be constituted from a sliding bearing or a fluid dynamic pressure bearing, for example.

A stator section 13 is supported on the outer periphery of the bearing housing 12a. The stator section 13 is furnished with a stator core, coils, an insulator 17 for insulating the coils from the stator core, and a circuit board 16. The stator core is covered with the insulator 17, which is made of an electrically insulating material, so as to electrically isolate the upper- and lower-end portions of the stator core and the stator teeth.

Coils are wound around each of the teeth via the insulator 17. The circuit board 16, which has a drive circuit for controlling the rotational driving of the rotor section 3, is disposed on the bottom portion of the stator section 13. The circuit board 16 is constituted by surface-mounting electronic components on a printed circuit board. The circuit board 16 is fastened to the lower portion of the insulator 17.

A rotor magnet 6, permanently magnetized inner-circumferentially with alternating poles, and a rotor yoke 5 that retains the rotor magnet 6 along its outer circumferential side, are attached to the inner peripheral surface of the impeller 4. The rotor magnet 6 opposes the stator section 13 via a radial gap. The interaction of the magnetic field generated through the stator core 14 and the magnetic field generated through the rotor magnet 6 develops rotational torque in the rotor section 3, whereby the rotor section 3 spins centered on the shaft 7. The spinning of the rotor section 3 spins the impeller 4, generating an airflow.

The frame 12 is defined axially opposing the circuit board 16, and is designed in the form of a disk whose diameter is approximately the same as the outer diameter of the circuit board 16. A fan cavity 2 forming a flowpath for the airstream developed through the impeller 4 is defined along the radially outer side of the frame 12. The frame 12 and the fan cavity 2 are connected via a rib 15. The rotor section 3 including the impeller 4 is disposed inside the fan cavity 2.

A thrust plate 10 for supporting the lower end portion of the shaft 7 is disposed along the bottom section 12b of the bearing housing 12a. The shaft 7 abuts on the thrust plate 10. The thrust plate 10 is formed from a wear-resistant material in consideration of the relative movement that may occur between the shaft 7 and the thrust plate 10.

Under the thrust plate 10, an attracting magnet 9 molded from a magnetic material is disposed, for electromagnetically attracting the fore-end portion of the shaft 7 through the thrust plate 10. The attracting magnet 9 is covered with an approximately cup-shaped magnet holder 11. The magnet holder 11 covers the lower-end and outer-peripheral portions of the attracting magnet 9.

The attracting magnet 9 abuts on and anchors to the inner-peripheral bottom portion of the magnet holder 11 under the magnet's magnetic force. Should more powerful anchoring strength be required, the attracting magnet 9 may be attached to the bottom section 12b interior by means such as press-fitting and/or adhesion.

Figure 4:
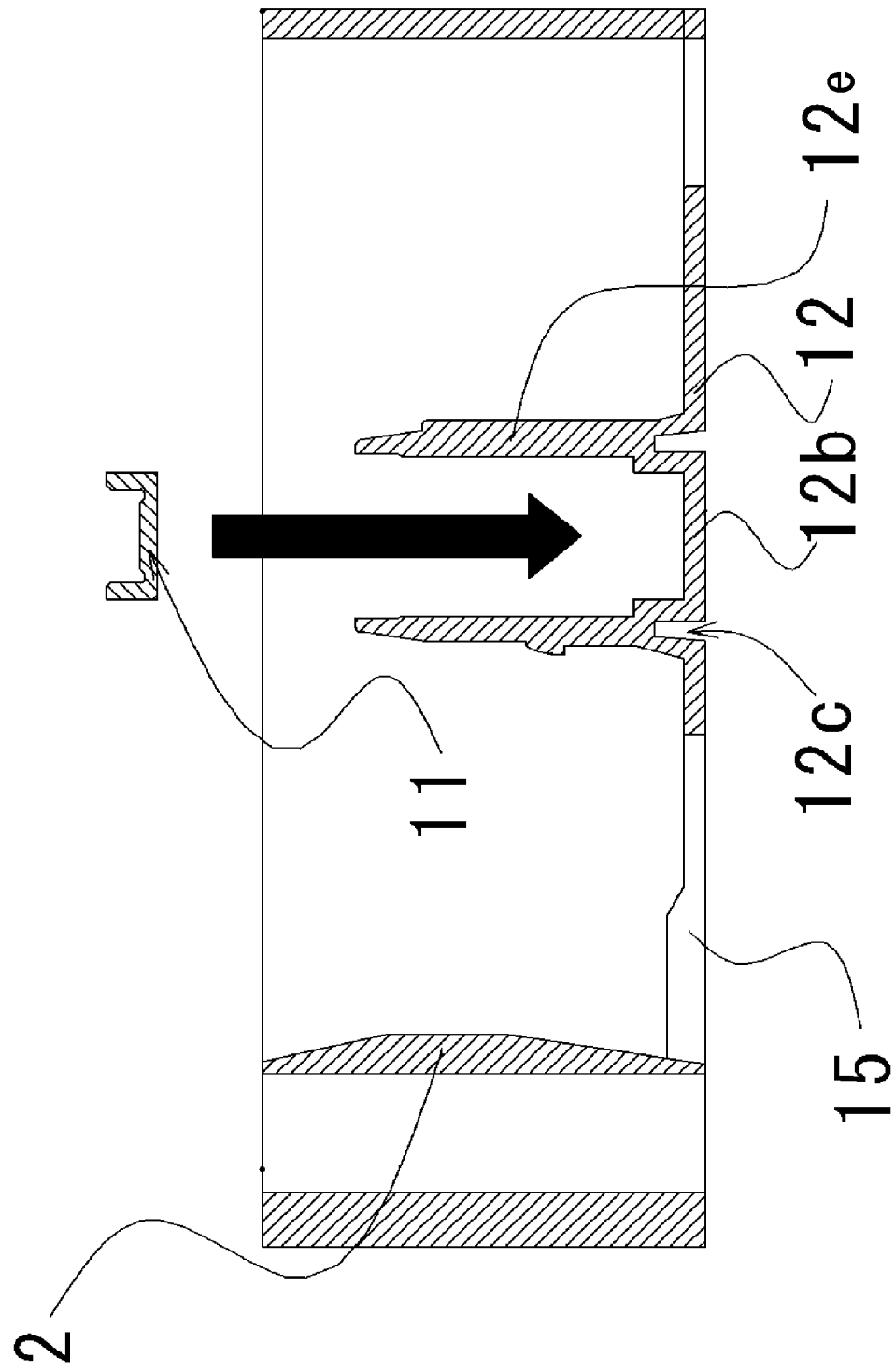
FIG. 4 is a cross sectional view depicting attachment of a magnet holder from FIG. 1 to the bearing housing.

As depicted in FIG. 4, the magnet holder 11 is inserted into the bottom section 12b of the bearing housing 12a, and anchored by an adhesive agent. The bottom section 12b is formed to have a cuplike configuration, and unitarily molded with the cylindrical section 12e. Thus, oil impregnated into the sleeve 8 does not leak from the bottom section 12b to the fan motor 1 exterior.

The magnet holder 11 is formed by press-working a metal plate of a magnetic material. Forming the magnet holder 11 of a magnetic material reduces leakage flux from the attracting magnet 9 to the fan motor 1 exterior. Furthermore, because the magnet holder 11 and the attracting magnet 9 form a magnetic circuit whereby magnetic resistance is decreased, increase in the magnetic attracting force that attracts the shaft 7 is made possible.

It should be noted that because implementations in which the inner diameter of the magnet holder 11 measures 3 mm or less are prohibitive of forming the magnet holder by pressing-working, the magnet holder 11 may be formed of a porous sintered metal in which magnetic powder is bake-hardened.

If the magnet holder 11 is formed from such a (porous) material, extremely minute pores will be formed in the holder surface and interior, making it necessary to prevent oil from permeating into the minute pores due to capillary action. That is, a pore-sealing process must be implemented on the magnet holder 11, because it can happen that permeating oil passes through the minute pores and seeps out to the motor exterior from the surface of the magnet holder 11.

For example, oil can be prevented from permeating into interior of the magnet holder 11 by subjecting the surface of the magnet holder 11 to a masking operation. Examples of masking operations include operations such as blanking (compressing the surface to close the pores), or applying a coating agent onto, the surface of the magnet holder 11.

More specifically, such techniques include: an operation of blanking the minute pores in the surface of the magnet holder 11 with a cutting tool; a shot blasting operation of blasting metal powder or particles onto the magnet holder 11 to blank the minute pores; and a coating process of applying a plastic resin onto the surface of the magnet holder 11 to close off the minute pores.

In other implementations, the magnet holder 11 can be impregnated with an oil-repellant plastic resin to close off the minute pores in at least the surface of the magnet holder 11. Of course, the minute pores in both the surface and the interior of the magnet holder 11 may be resin-impregnated. This configuration enables oil to be repelled from clinging to the surface of the magnet holder 11, preventing the oil from leaking out to the fan motor 1 exterior. The pore-sealing process on the magnet holder 11 is performed before the holder is attached to the bottom section 12b.

It will be appreciated that the pore-sealing process on the magnet holder 11 may be implemented after the magnet holder 11 is attached to the bottom section 12b, but in a process step before the attracting magnet 9 is attached to the magnet holder 11. In that case, an oil repellant is applied to the region of the joint between the magnet holder 11 and the frame 12, and to the upper surface of the magnet holder 11. The application of the oil repellant forms a solidified oil-repelling layer on the joint region and the upper surface of the magnet holder 11. The oil-repelling layer prevents oil from permeating into the surface and interior of the magnet holder 11.

Figure 2A:
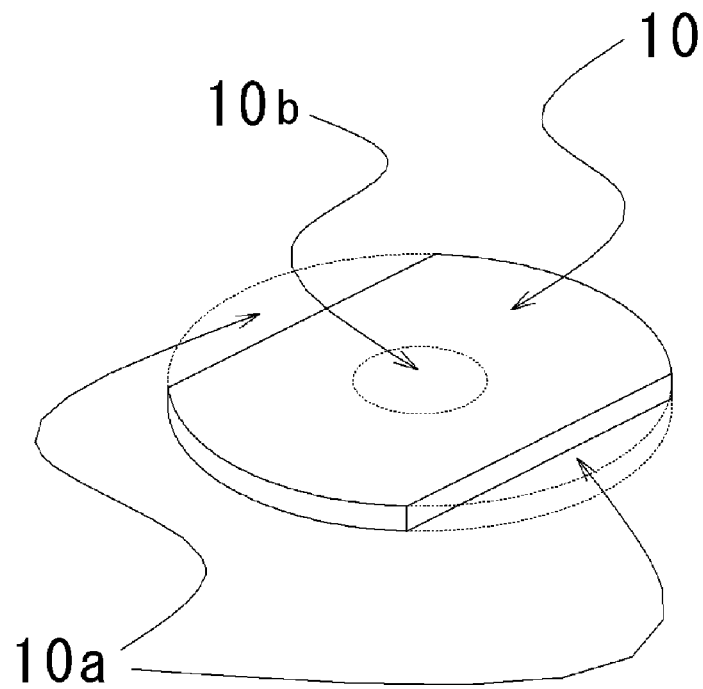
FIG. 2A is an oblique view depicting a thrust plate from FIG. 1.
Figure 2B:
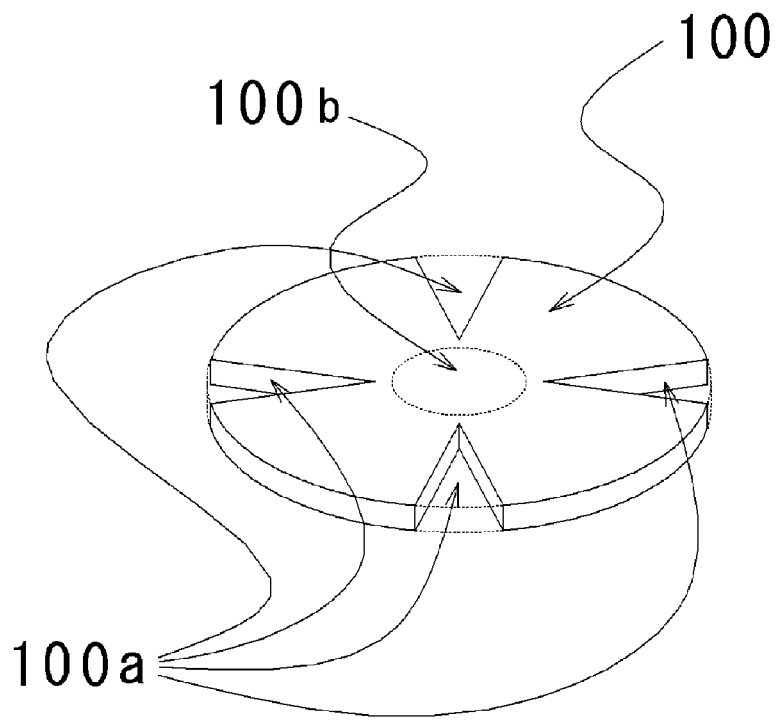
FIG. 2B is an oblique view depicting a modified example of FIG. 2A.
Figure 3:
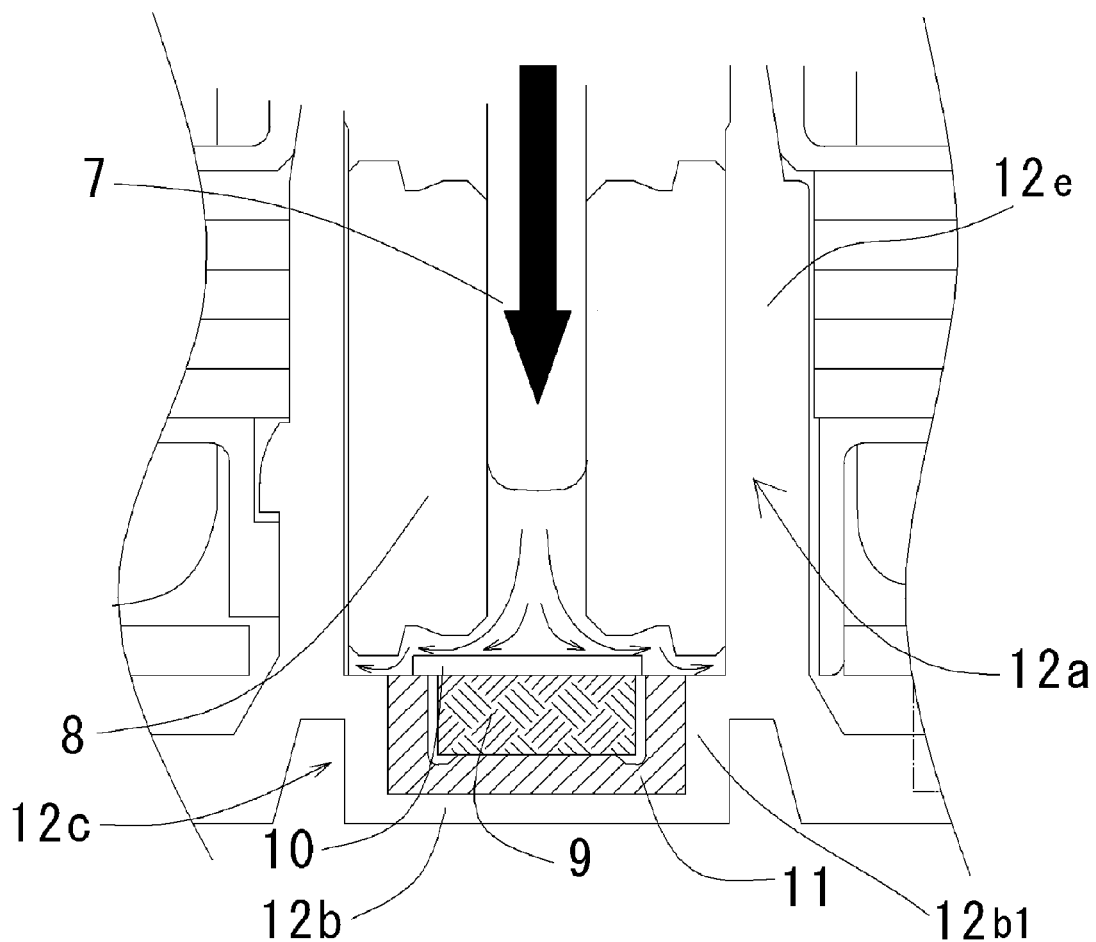
FIG. 3 is a cross sectional view depicting, in an enlarged view, key components from FIG. 1, to illustrate an air discharge passageway in inserting a bearing-unit shaft into a bearing housing.

As depicted in FIGS. 1 through 3, the bottom section 12b is, as noted earlier, cuplike in form. Between a sidewall portion 12b1 of the bottom section 12b, and the frame 12, a frame notched portion 12c indenting upward through the lower-end portion of the frame 12 is formed. The frame notched portion 12c decreases the disparity in thickness between the frame 12, the bottom section 12b, and their encompassing structure, to realize uniformization of heat shrinking between the bottom section 12b and the encompassing structure during molding of the frame 12. Incidents of shrink marks and warpage can therefore be minimized. It will be appreciated that the frame notched portion 12c may be formed circumferentially either in an annular form, or as a plurality of individual notches.

The description now turns specifically to FIG. 2A, an oblique view of the thrust plate 10 in FIG. 1, and to FIG. 3, a view depicting an air discharge passageway when the shaft 7 is inserted into the sleeve 8. (The arrow in FIG. 3 indicates the flow of air.)

As depicted in FIG. 2A, the thrust plate 10 is discoid in form, but in the outer periphery of the thrust plate 10, plate cuts 10a, where a portion of the outer periphery is removed, are fashioned.

As indicated in FIG. 3, when the shaft 7 is inserted through the sleeve 8, a space forms between the fore-end portion of the shaft 7 and the sleeve 8, and the thrust plate 10. Air intervening in the space flows in the direction of the arrow as insertion of the shaft 7 proceeds. The air intervening in the space passes through the plate cuts 10a in the thrust plate 10, and thereafter, passing through a gap formed between the outer circumferential surface of the sleeve 8 and the inner circumferential surface of the cylindrical section 12e, as well as through the interior of the sleeve 8, is then discharged to the exterior of the bearing unit 30.

It will be appreciated that the plate cuts 10a can be formed in various geometries, as long as they are not formed in the area 10b, as indicated in FIG. 2A, where the shaft 7 abuts on the thrust plate 10. For example, as illustrated in FIG. 2B, along the outer periphery of a thrust plate 100, a plurality of radially inward-indenting, approximately V-shaped plate notches 100a may be formed. And in other implementations, a single such plate notch 100a may be formed.

The frame 12 and the bearing housing 12a may be formed by die casting, in which the components are molded into desired form by charging molten metal into a precision mold. In such implementations, examples of substances for the frame 12 and the bearing housing 12a would include aluminum and aluminum alloys.

SECOND EMBODIMENT

Figure 5:
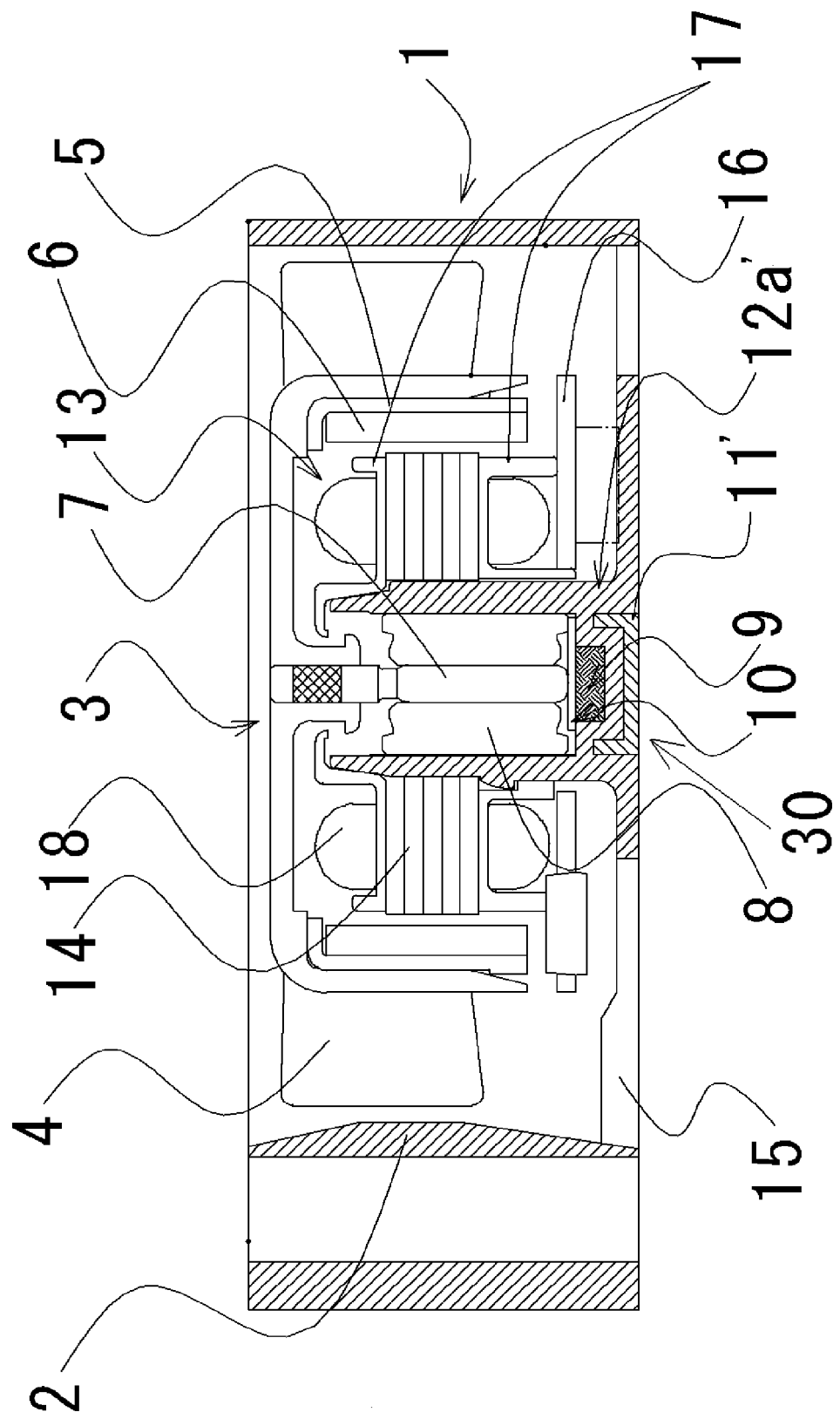
FIG. 5 is a cross sectional view depicting a second embodiment of the present invention.

Reference is now made to FIG. 5, a cross sectional view depicting a motor of a second embodiment of the present invention. In FIG. 5, the same reference numerals as in FIG. 1 are used to indicate features that are the same as, or correspond to, those of the latter figure. Inasmuch as the basic configuration of the fan motor of FIG. 5 is the same as the fan motor of FIG. 1, the description will focus chiefly on the components that differ from those of FIG. 1.

On a bottom-section 12b' side (FIG. 6) of a bering housing 12a', the thrust plate 10 for supporting the lower-end portion of the shaft 7 is disposed, and on the underside of the thrust plate 10, the attracting magnet 9 is disposed, wherein the attracting magnet 9 is attached to the bottom section 12b'. Here too, the bottom section 12b' is formed to have a cuplike configuration, wherein the bottom section 12b' covers the lower end and outer peripheral portions of the attracting magnet 9.

An approximately cup-shaped magnet holder 11' is attached to the bottom section 12b'. Herein, the magnet holder 11' is formed diametrically larger than that of the magnet holder of the first embodiment.

Figure 6:
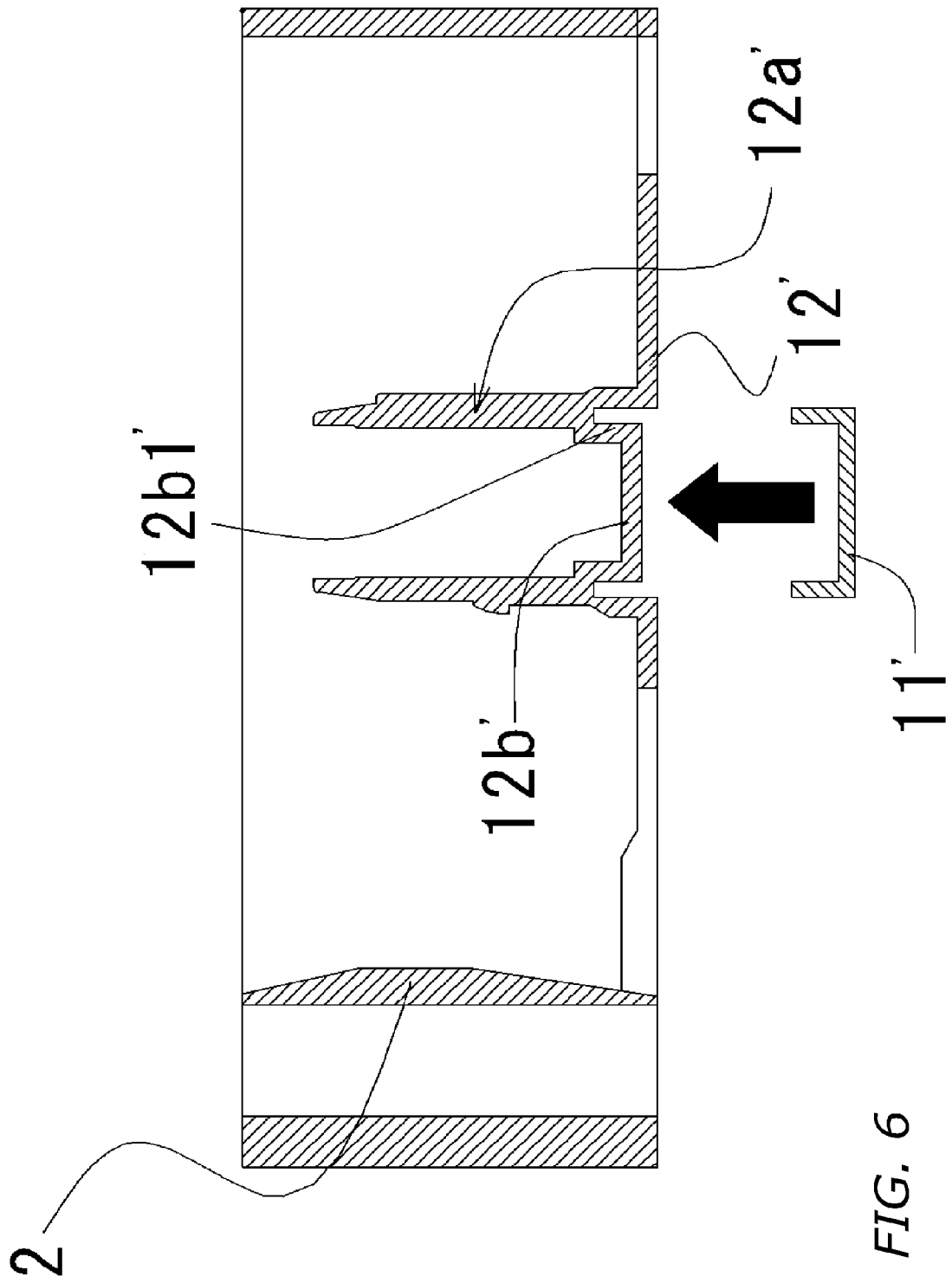
FIG. 6 is a cross sectional view depicting attachment of a magnet holder from FIG. 5 to the bearing housing.

As illustrated in FIG. 6, the magnet holder 11' is attached to the bottom section 12b' and a sidewall portion 12b1' of the bottom section 12b' by means such as press-fitting and/or adhesion. Under its force of magnetic attraction for the magnet holder 11', the attracting magnet 9 attaches to the bottom section 12b' interior.

Should more powerful anchoring strength be required, however, the attracting magnet 9 may be attached to the bottom section 12b' interior by means such as press-fitting and/or adhesion.

Forming the magnet holder 11' of a magnetic material reduces leakage flux from the attracting magnet 9 to the fan motor 1 exterior. Furthermore, because the magnet holder 11' and the attracting magnet 9 form a magnetic circuit whereby magnetic resistance is decreased, increase in the magnetic attracting force that attracts the shaft 7 is made possible.

In FIG. 5, the lower-end surface of the magnet holder 11' is disposed flush with the lower end surface of the frame 12', but the lower-end surface of the magnet holder 11' may be disposed to the upper or lower side of the lower-end surface of the frame 12'.

THIRD EMBODIMENT

Figure 7:
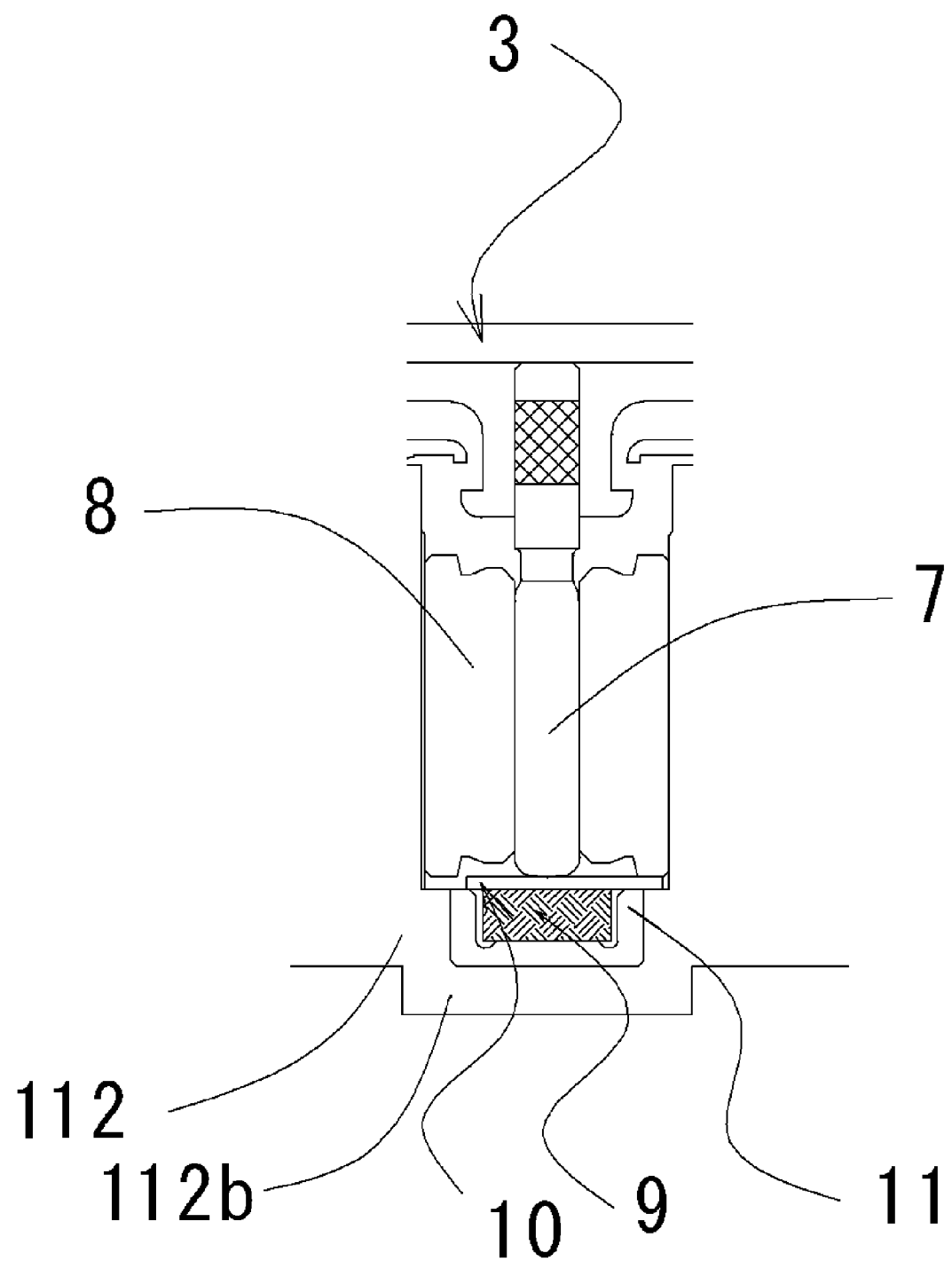
FIG. 7 is a cross sectional view depicting a third embodiment of the present invention.

A third embodiment of the present invention is illustrated in the FIG. 7, cross-sectional view. Inasmuch as the basic configuration of the fan motor is the same as that of the first embodiment, an explanation primarily of the components that differ will be made.

As depicted in FIG. 7, a frame bottom section 112b is disposed protruding downward from the lower-end surface of a frame 112. This configuration enables such improvements in motor characteristics as extending the axial length of the radial bearing section, and increasing the number of stator-core laminations, by the extent to which the protrusion measures.

FOURTH EMBODIMENT

Figure 8:
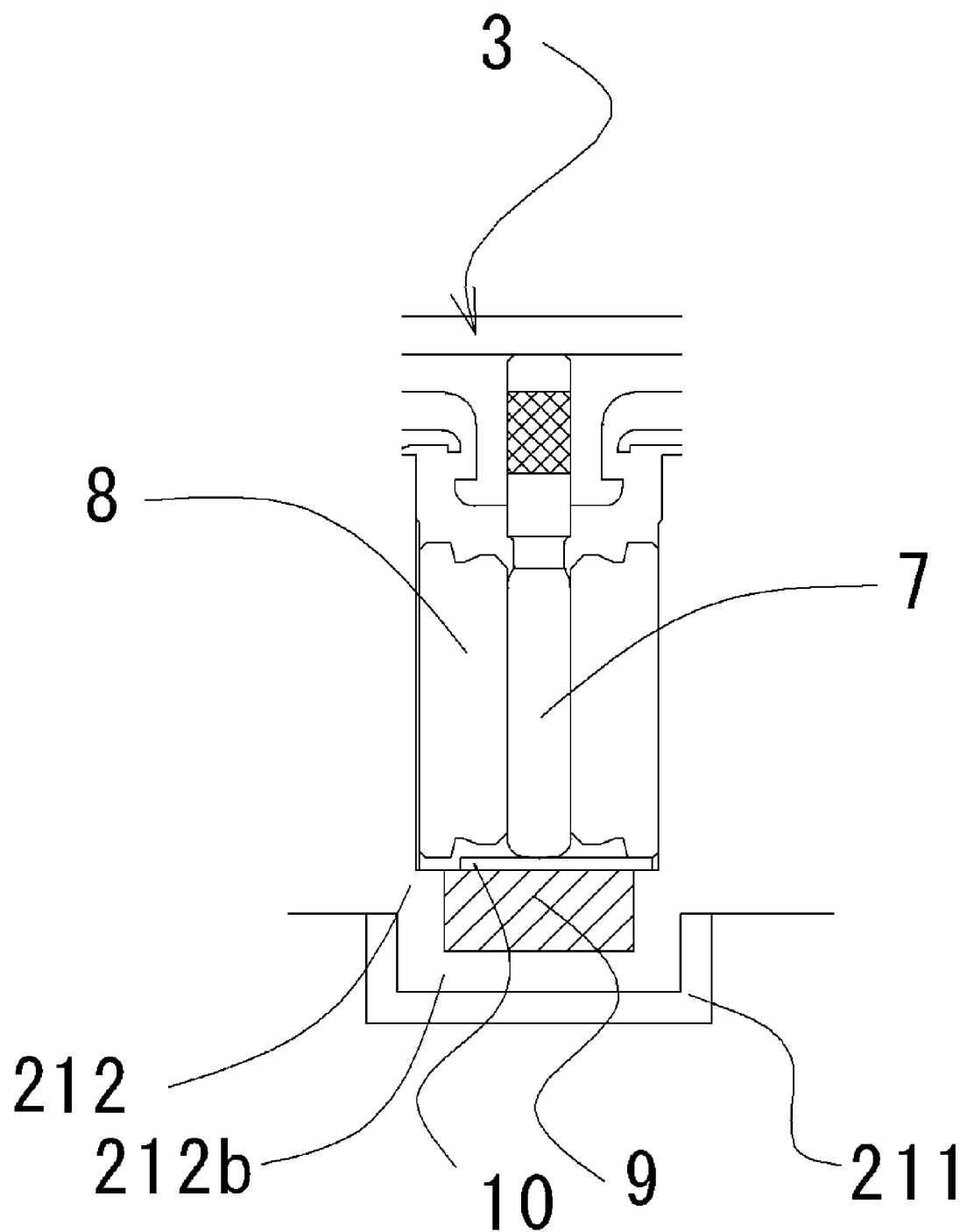
FIG. 8 is a cross sectional view depicting a fourth embodiment of the present invention.

A cross sectional view illustrating a fourth embodiment of the present invention is presented in FIG. 8. Inasmuch as the basic configuration of the fan motor is the same as that of the second embodiment, an explanation primarily of the components that differ will be made.

As depicted in FIG. 8, a frame bottom section 212b is disposed protruding downward from the lower-end surface of a frame 212. In addition, the lower-end surface of a magnet holder 211 attached to the bottom section 212b also protrudes downward from the lower-end surface of the frame 212. This configuration enables such improvements in motor characteristics as extending the axial length of the radial bearing section, and increasing the number of stator-core laminations, by the extent to which the protrusion measures.

FIFTH EMBODIMENT

Figure 9:
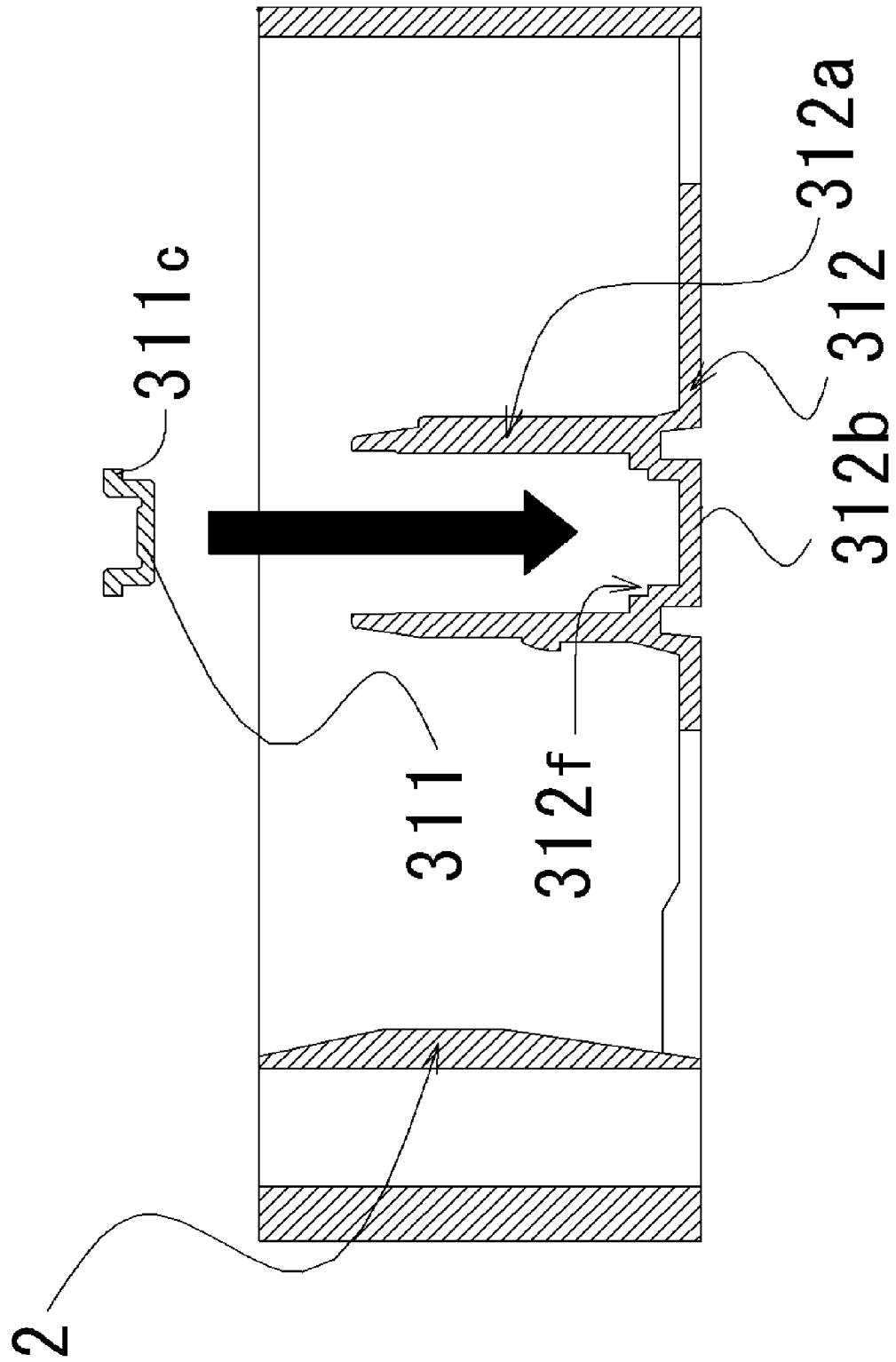
FIG. 9 is a cross sectional view depicting a fifth embodiment of the present invention.

The description turns now to FIG. 9, a cross sectional view illustrating a fifth embodiment of the present invention. Inasmuch as the basic configuration of the fan motor is the same as that of the first embodiment, an explanation chiefly of the components that differ will be made.

As depicted in FIG. 9, at the upper-end portion of a magnet holder 311, a flange portion 311c jutting radially outward from the upper-end portion is formed. And in a frame 312 bottom section 312b, a downward-recessed stepped portion 312f is formed.

The flange portion 311c and the stepped portion 312f are designed to come into abutment at the lead when the magnet holder 311 is attached to the bottom section 312b. The abutting of the flange portion 311c on the stepped portion 312f determines the axial positioning of the magnet holder 311 with respect to the bottom section 312b.

In implementations not formed with the flange portion and the stepped portion, the magnet holder abuts on the frame bottom portion to determine the axial positioning of the magnet holder. If, however, the axial dimension of the frame bottom portion is thin, the bottom portion can be damaged by the abutting impact when the magnet holder abuts on the bottom portion.

With the configuration of the present embodiment, the fact that the flange portion 311c comes into abutment with the stepped portion 312f at the lead during the process of attaching magnet holder 311 makes it possible to prevent damage to the bottom section 312b, to realize a bearing unit that excels in reliability and durability.

It will be appreciated that the geometry of the flange portion 311c and of the stepped portion 312f is not limited to that just described, but can be modified into various forms.

SIXTH EMBODIMENT

Figure 10:
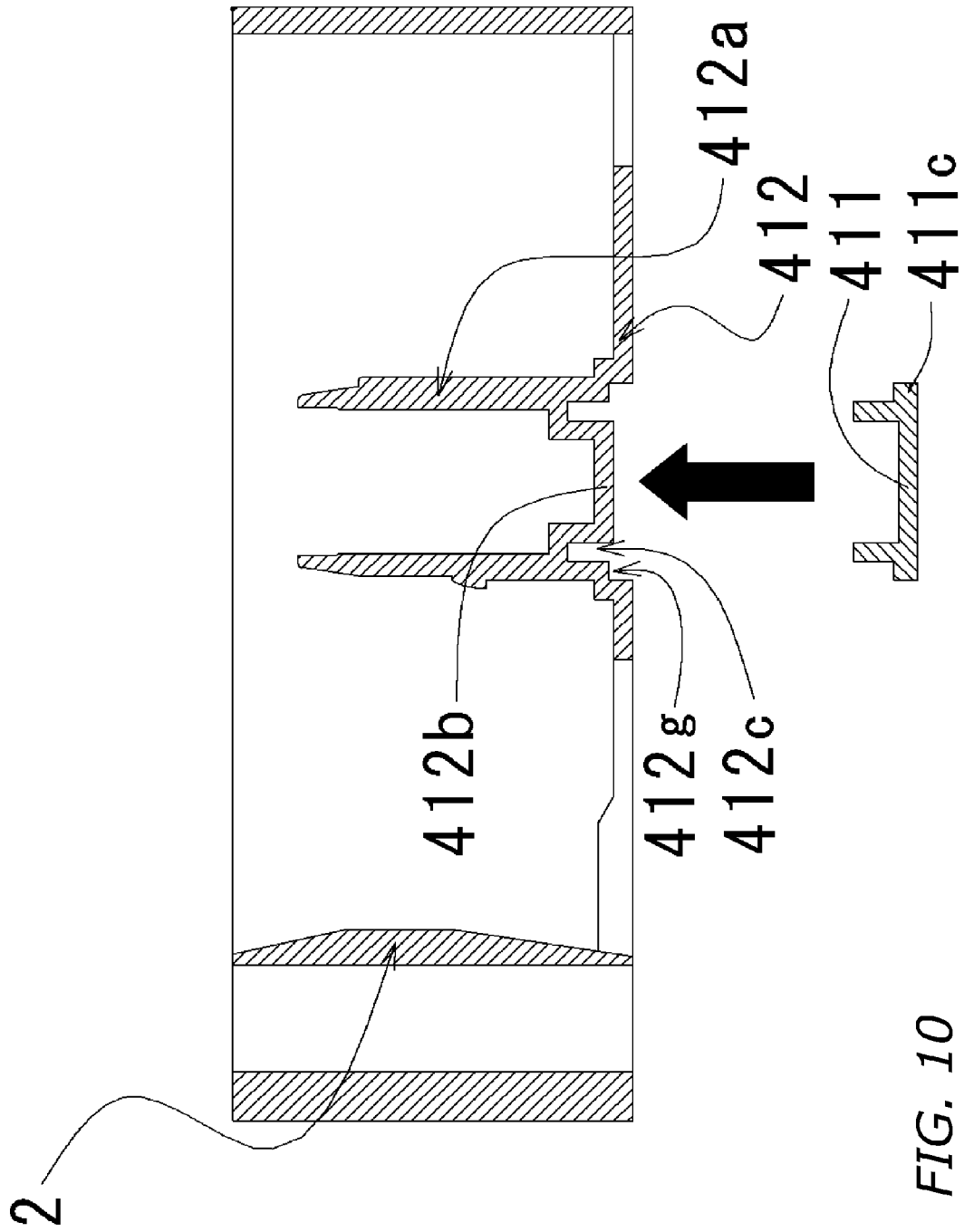
FIG. 10 is a cross sectional view depicting a sixth embodiment of the present invention.

A sixth embodiment of the present invention is illustrated in the FIG. 10, cross-sectional view. Inasmuch as the basic configuration of the fan motor is the same as that of the second embodiment, an explanation chiefly of the components that differ will be made.

As depicted in FIG. 10, on the lower-end portion of a magnet holder 411, a radially outward projecting protrusion 411 c is formed. In a frame notch portion 412c of a frame 412, an upwardly recessed stepped portion 412g is formed.

The protrusion 411 c and the stepped portion 412g are designed to come into abutment at the lead when the cuplike magnet holder 411 is attached to the frame bottom section 412b. The abutting of the protrusion 411c on the stepped portion 412g determines the axial positioning of the magnet holder 411 with respect to the bottom section 412b.

In implementations not formed with the protrusion and the stepped portion, the magnet holder abuts on the frame bottom portion to determine the axial positioning of the magnet holder. If, however, the axial dimension of the frame bottom portion is thin, the bottom portion can be damaged by the abutting impact when the magnet holder abuts on the bottom portion.

With the configuration of the present embodiment, the fact that the protrusion 411c comes into abutment with the stepped portion 312f at the lead during the process of attaching magnet holder 411 makes it possible to prevent damage to the bottom section 412b, to realize a bearing unit that excels in reliability and durability.

It will be appreciated that the geometry of the protrusion 411c and of the stepped portion 412g is not limited to that just described, but can be modified into various forms.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

For example, in each of the above-described embodiments, the shaft rotates, but the embodiments are not thereby limited; the sleeve and the bearing retaining part may instead rotate.

What is claimed is:

1. A bearing unit for an electric motor, the bearing unit comprising:
    a cylindrical sleeve;
    a shaft received in the sleeve, such that one of the shaft and the sleeve is rotatable relative to the other about a central axis;
    a lubricating fluid confined between opposing surfaces of the shaft and the sleeve, the lubricating fluid and the opposing surfaces constituting a radial bearing in which the lubricating fluid supports the shaft and the sleeve during rotation of said one of the shaft and the sleeve relative to the other;
    a bearing retainer including a cylindrical section extending around the sleeve, and a bottom section covering and thereby closing off a bottom end of the cylindrical section, the bearing retainer being in the form of a single, seamless member whereby the cylindrical and bottom sections of the bearing retainer are unitary;
    an attracting magnet disposed in the bearing retainer at the bottom section thereof, and positioned relative to the shaft so as to magnetically attract a lower end of the shaft in a direction coinciding with said central axis; and
    a magnet holder, made of a magnetic material, disposed beneath the attracting magnet and attached to said the bearing retainer.

2. A bearing unit as set forth in claim 1, further comprising a wear-resistant thrust plate provided in between the attracting magnet and the lower end of the shaft.

3. A bearing unit as set forth in claim 2, wherein the trust plate is approximately discoid in form, the radial distance from the center axis to the outer periphery in a portion of said thrust plate being smaller than the radius of the discoid.

4. A bearing unit as set forth in claim 1, wherein the magnet holder has a cuplike form, and encompasses the bottom and outer circumference of the attracting magnet.

5. A bearing unit as set forth in claim 4, wherein the bottom section of the bearing retainer has a downwardly recessed, cuplike form, and the magnet holder is disposed in the bottom section of the bearing retainer.

6. A bearing unit as set forth in claim 4, wherein the bottom section of the bearing retainer has a downwardly recessed, cuplike form, and the magnet holder is disposed beneath the bottom section of the bearing retainer.

7. A bearing unit as set forth in claim 1, wherein the magnet holder is made of a porous sintered metallic material.

8. A bearing unit as set forth in claim 7, wherein the magnet holder further comprises an outer coating of a plastic resin or has a superficially compressed outer portion, to reduce openings in the surface of the magnet holder provided by pores of the sintered metallic material.

9. A bearing unit as set forth in claim 1, wherein the magnet holder is impregnated with an oil-repellant resin.

10. A bearing unit as set forth in claim 1, wherein at least a portion of the outer surface of the magnet holder is coated with an oil-repellant resin.

11. A bearing unit as set forth in claim 1, wherein the bottom section of the bearing retainer has a downwardly recessed, cuplike form, and the magnet holder is disposed in the bottom section of the bearing retainer.

12. A bearing unit as set forth in claim 1, wherein the bottom section of the bearing retainer has a downwardly recessed, cuplike form, and the magnet holder is disposed beneath the bottom section of the bearing retainer.

13. A bearing unit as set forth in claim 1, wherein the bearing retainer is a resin member.

14. A bearing unit as set forth in claim 1, wherein the bearing retainer is of aluminum or an aluminum alloy.

15. An electric machine comprising:
 a cylindrical sleeve;
 a shaft received in the sleeve such that one of the shaft and the sleeve is rotatable relative to the other about a central axis;
 a lubricating fluid confined between opposing surfaces of the shaft and the sleeve, the lubricating fluid and the opposing surfaces constituting a radial bearing in which the lubricating fluid supports the shaft and the sleeve during rotation of said one of the shaft and the sleeve relative to the other;
 a bearing retainer including a cylindrical section extending around the sleeve, and a bottom section covering and thereby closing off a bottom end of the cylindrical section, the bearing retainer being in the form of a single seamless member whereby the cylindrical and bottom sections of the beam retainer are unitary;
 an attracting magnet disposed in the bearing retainer at the bottom section thereof, and positioned relative to the shaft so as to magnetically attract a lower end of the shaft in a direction coinciding with said central axis;
 a magnet holder, made of a magnetic material, disposed beneath the attracting magnet and attached to the bearing retainer;
 a rotor magnet fixed to said one of the shaft and the sleeve so as to constitute a rotor therewith; and
 a stator section opposing said rotor magnet, and constituting a stator with said other of the shaft and the sleeve.

16. An electric machine as set forth in claim 15, further comprising a resin frame integrate with the bearing retainer.

17. An electric machine as set forth in claim 16, wherein the bottom section of the bearing retainer has a downwardly recessed, cuplike form and a sidewall of the bottom section of the bearing retainer and the frame define at least one notch therebetween.

18. An electric machine as set forth in claim 15, wherein the rotor further includes an impeller for generating, during its rotation, an airflow.

19. A bearing unit as set forth in claim 1, wherein the bottom section of the bearing retainer has an inner sidewall surface and a bottom wall surface delimiting a downwardly extending recess, the width of the recess is smaller than the inner diameter of the cylindrical section of the bearing retainer such that an inner radially extending step is defined between the bottom section and the cylindrical section, and the outer diameter of the sleeve is greater than the width of the recess of the bottom section of the bearing retainer, the attracting magnet being disposed in the recess, and the sleeve being disposed on the step.

20. An electric machine as set forth in claim 15, wherein the bottom section of the bearing retainer has an inner sidewall surface and a bottom wall surface delimiting a downwardly extending recess, the width of the recess is smaller than the inner diameter of the cylindrical section of the bearing retainer such that an inner radially extending step is defined between the bottom section and the cylindrical section, and the outer diameter of the sleeve is greater than the width of the recess of the bottom section of the bearing retainer, the attracting magnet being disposed in the recess, and the sleeve being disposed on the step.

* * * * *